(12) United States Patent
Yudin

(10) Patent No.: US 9,017,077 B2
(45) Date of Patent: Apr. 28, 2015

(54) BLOCK LEARNING GAME

(71) Applicant: Gwendolyn Yudin, Huntington, NY (US)

(72) Inventor: Gwendolyn Yudin, Huntington, NY (US)

(*) Notice: Subject to any disclaimer, the term of this patent is extended or adjusted under 35 U.S.C. 154(b) by 0 days.

(21) Appl. No.: 13/948,353

(22) Filed: Jul. 23, 2013

(65) Prior Publication Data

US 2015/0031265 A1    Jan. 29, 2015

(51) Int. Cl.
G09B 11/00 (2006.01)
G09B 19/00 (2006.01)
A63H 33/04 (2006.01)
G09B 19/02 (2006.01)

(52) U.S. Cl.
CPC ............ *G09B 19/0023* (2013.01); *A63H 33/04* (2013.01); *G09B 19/02* (2013.01)

(58) Field of Classification Search
USPC ............... 434/81, 96, 98, 207, 170, 172, 174, 434/402, 403, 404; 446/118, 117
See application file for complete search history.

(56) References Cited

U.S. PATENT DOCUMENTS

| | | | |
|---|---|---|---|
| 191,167 A * | 5/1877 | Kenney | 434/98 |
| 1,492,671 A * | 5/1924 | Bruel | 434/96 |
| 1,636,371 A * | 7/1927 | Kenney | 434/96 |
| 2,500,263 A * | 3/1950 | Pascoo | 434/96 |
| 2,534,550 A * | 12/1950 | Frechtmann | 434/96 |
| D184,396 S * | 2/1959 | Mueller | D21/500 |
| RE25,031 E * | 8/1961 | Bruel | 434/96 |
| 3,464,145 A | 9/1969 | Martin | |
| 3,987,558 A * | 10/1976 | Tsukamoto | 434/96 |
| 4,308,016 A | 12/1981 | White | |
| 4,335,879 A | 6/1982 | Wiskur | |
| 4,568,082 A | 2/1986 | Musolino | |
| 4,717,342 A * | 1/1988 | Hidvegi | 434/96 |
| 5,108,291 A | 4/1992 | Kuo et al. | |
| 5,137,452 A | 8/1992 | Pollock | |
| 5,487,668 A * | 1/1996 | Oyen et al. | 434/98 |
| 6,176,704 B1 | 1/2001 | Gilbert | |
| 6,659,774 B1 | 12/2003 | Ramos et al. | |
| 6,790,118 B2 | 9/2004 | Ahn | |
| 2008/0118896 A1* | 5/2008 | Cha | 434/96 |
| 2008/0131865 A1* | 6/2008 | Ernest | 434/403 |

* cited by examiner

*Primary Examiner* — Kurt Fernstrom
(74) *Attorney, Agent, or Firm* — Delaney Patents

(57) ABSTRACT

A learning toy that includes a frame and a plurality of blocks. Each block includes a different color on each face with a first face having a first color and a second face having a second color. Additionally, four different colors are separately assigned to each of the remaining faces and the color assignments vary between at least two blocks of the plurality of blocks. The plurality of blocks allow for consistency and variability. Consistency comes from the colors assigned to two faces staying the same between blocks and the variability comes from the colors assigned to remaining four faces varying between some blocks.

18 Claims, 8 Drawing Sheets

BLOCK LEARNING GAME

TECHNICAL FIELD

The present disclosure relates generally to a block learning game, and, more particularly, to a plurality of multi-colored blocks and a frame.

BACKGROUND

There are many learning toys used to teach different techniques to children, special needs children, and special needs adults. Specifically different block games have been used in the past to teach shapes, color, forms, and counting.

One prior art toy is U.S. Pat. No. 6,176,704, which discloses a frame that holds a plurality of identical blocks. The frame has a clear window on the top and bottom of the frame. Each block has six surfaces and four of those surfaces each include a single primary color. The two remaining surfaces include two colors on each surface with each color extending from the edge to the surface diagonal. The goal of this toy is that when blocks are placed in the frame, a light pattern is viewable through one side of the frame and an opposing dark pattern is viewable through the other window on the frame. This toy provides consistency because there blocks are all the same.

Another prior art toy is U.S. Pat. No. 5,487,668, which discloses a set of blocks and a tray for creating various patterns. The frame holds 49 blocks and half the block (25) have a white face, at least two faces with primary colors, and at least two faces with secondary colors, and the other half of the blocks (24) have a black face, at least two faces with primary colors, and at least two faces with secondary colors. But no block has both a black and white surface. The colors on the faces may vary between blocks because there are five remaining faces and a choice of six colors for each block. This toy provides variability in blocks by varying the colors used on each block.

However, there is a need for a toy with consistent colors but variability in locations of colors within the block.

SUMMARY

A learning toy that includes a frame and a plurality of blocks. Each block includes a different color on each face with a first face having a first color and a second face having a second color. Additionally, four different colors are separately assigned to each of the remaining faces and the color assignments vary between at least two blocks of the plurality of blocks. The plurality of blocks allow for consistency and variability. Consistency comes from the colors assigned to two faces staying the same between blocks and the variability comes from the colors assigned to remaining four faces varying between some blocks.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1A:
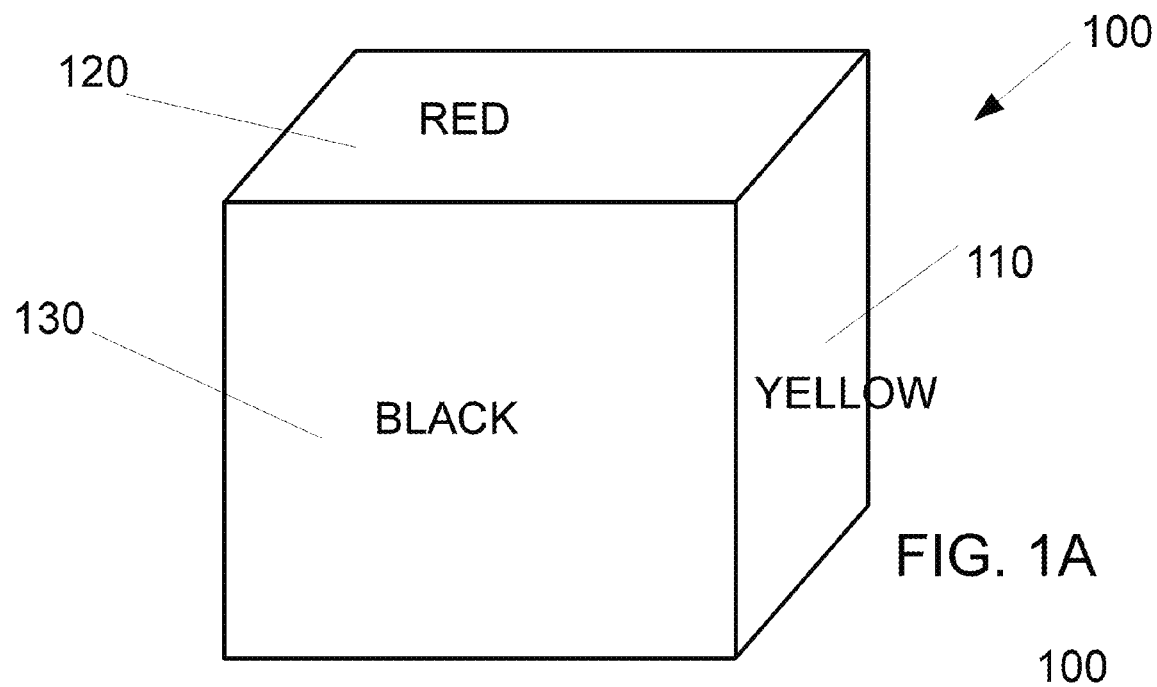
FIGS. 1A-1F are perspective views of three blocks.
Figure 1B:
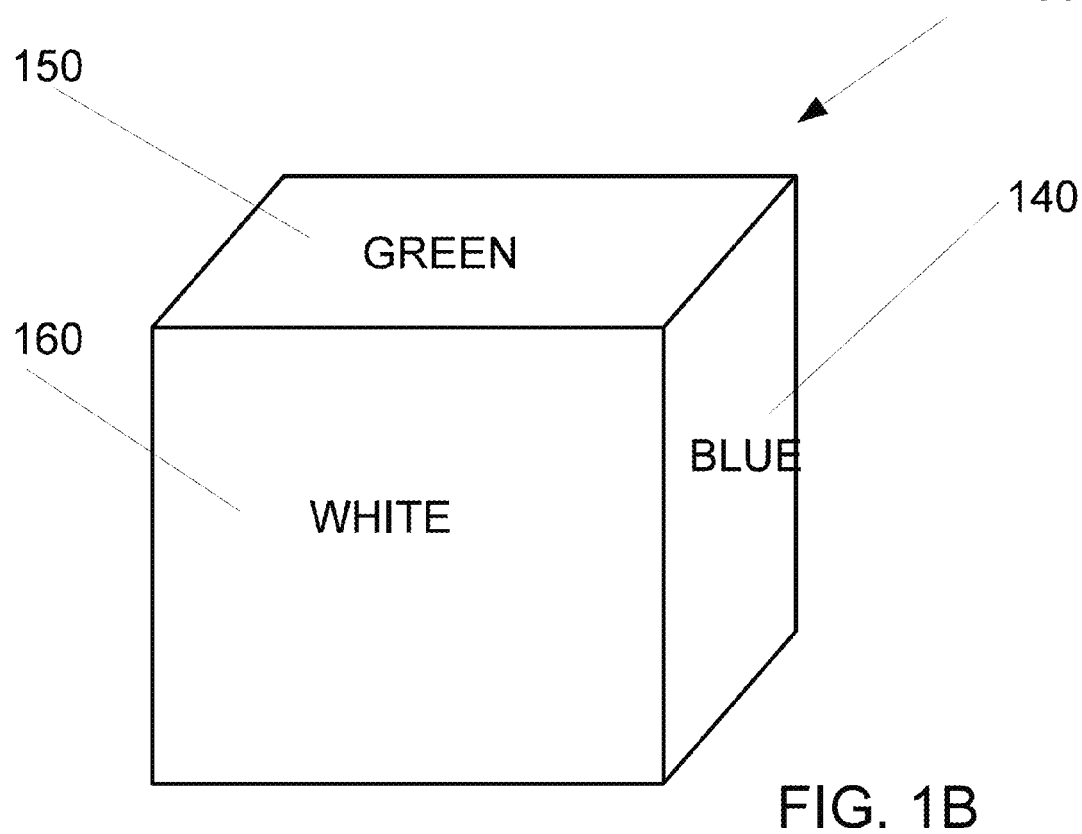

Referring now to the drawings where the illustrations are for the purpose of describing an embodiment of the present invention and are not intended to limit the invention disclosed herein. FIG. 1A and FIG. 1B are a perspective view of a first block 100. The block includes six faces 110, 120, 130, 140, 150, and 160. For this example the colors shown are yellow 110, red 120, black 130, blue 140, green 150, and white 160. Surface 130 and surface 160 are opposite surfaces on block 100. The color on each surface of block 100 extends to all edges of that surface.

Figure 1C:
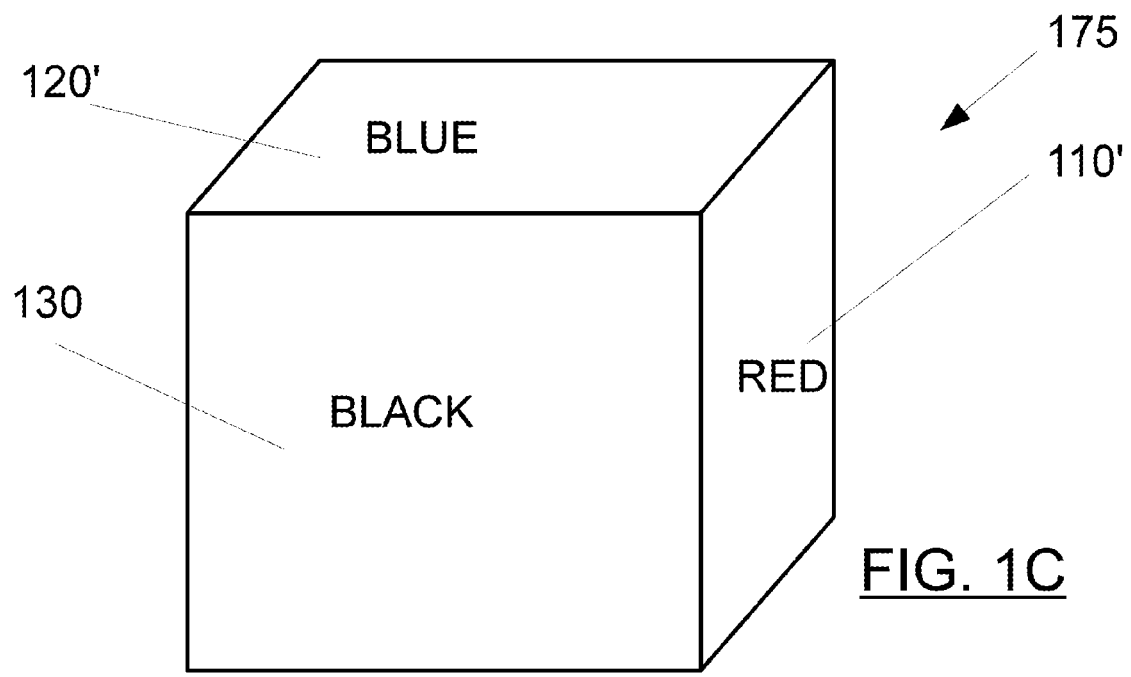
Figure 1D:
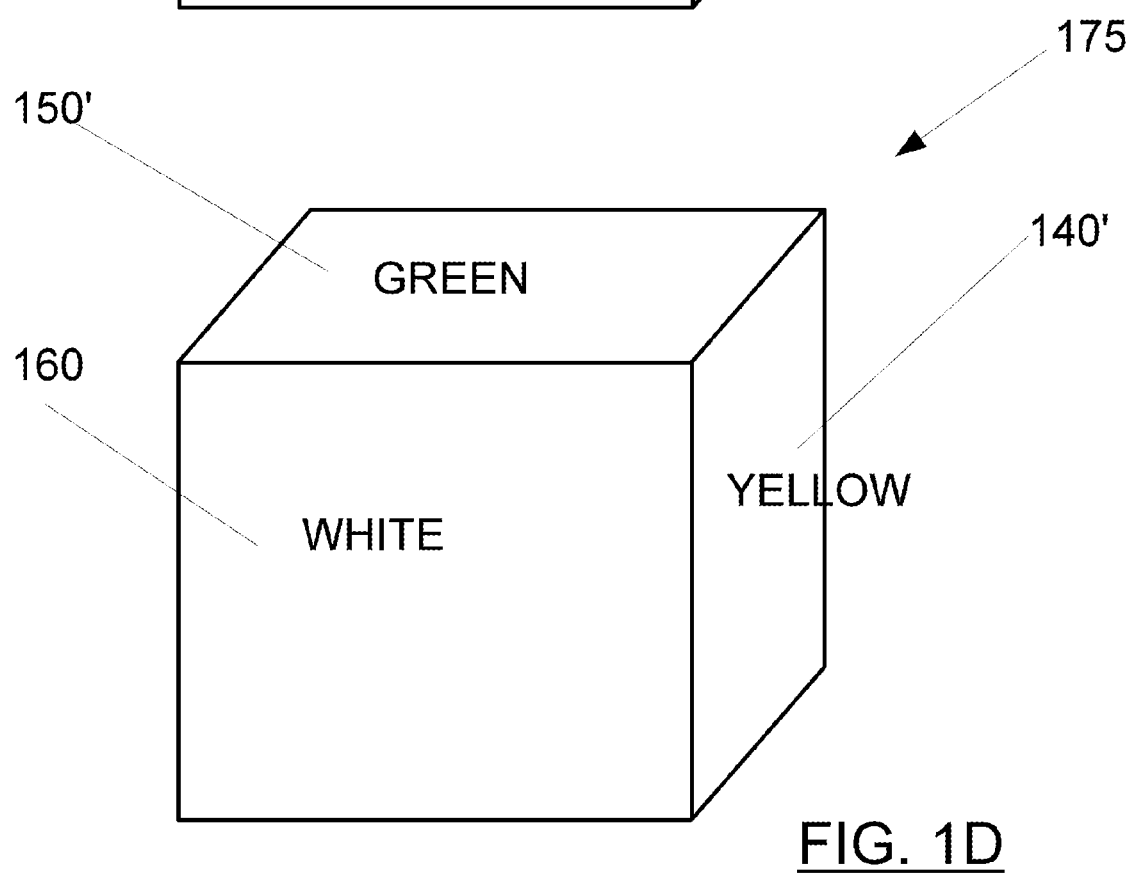

FIG. 1C and FIG. 1D are a perspective view of a second block 175. Similar to block 100, block 175 includes six surfaces 110', 120', 130, 140', 150', and 160. For this example the colors shown are red 110', blue 120', black 130, yellow 140', green 150', and white 160. Surface 130 and surface 160 are opposite surfaces on block 175. The color on each surface of block 175 extends to all edges of that surface.

Figure 1E:
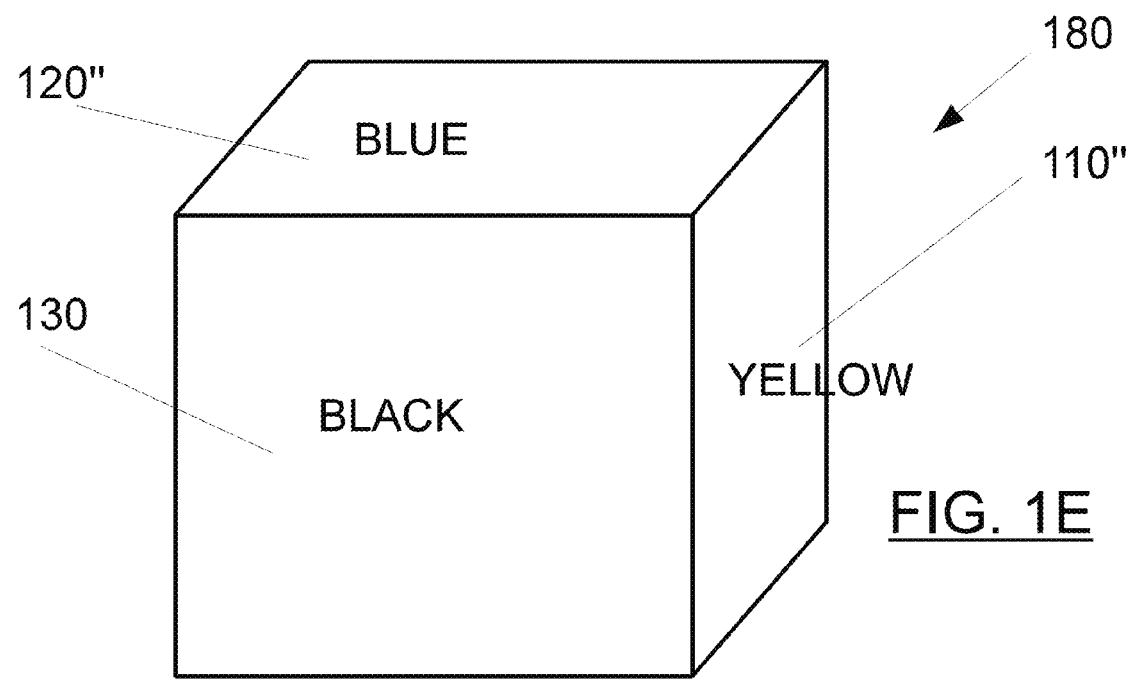
Figure 1F:
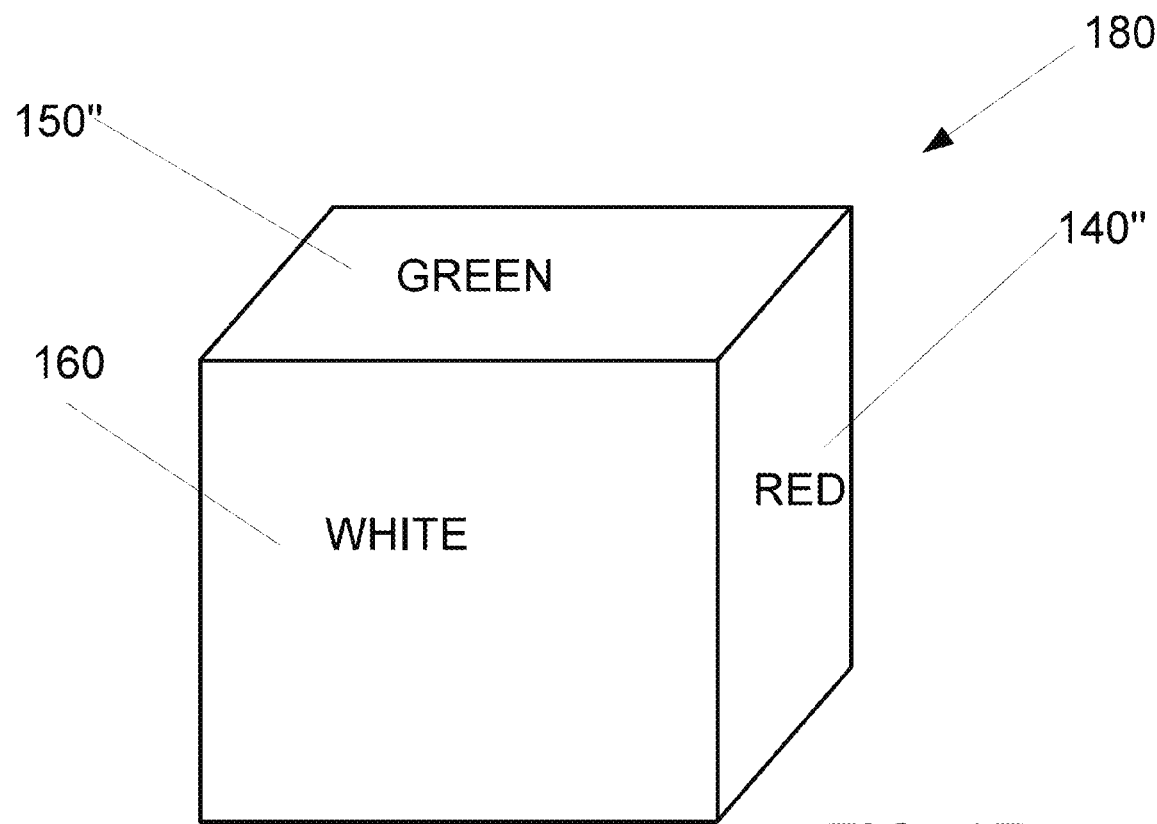

FIG. 1E and FIG. 1F are a perspective view of a third block 180. Similar to block 100, block 185 includes six surfaces 110", 120", 130, 140", 150", and 160. For this example the colors shown are yellow 110", blue 120", black 130, red 140", green 150", and white 160. Surface 130 and surface 160 are opposite surfaces on block 180. The color on each surface of block 180 extends to all edges of that surface.

First block 100, second block 175, and third block 180 each have the same color on two surfaces of block, surfaces 130, 160. The four remaining surfaces are each assigned a different color from a set of four colors. In other words, each block 100, 175, 180 have the same colors on each block but the location of four of the colors vary between blocks. The fixed color surface 130, 160 provide consistency to the user, while the remaining faces of each block provide variability to the user.

The colors (white, black, blue, green, yellow, and red) used on first block 100, second block 175, and third block 180 are shown as an example. Alternatively other colors may be used such as a combination of just primary colors (red, yellow, and blue) and secondary colors (green, purple, and orange). Alternatively, any other color combination is possible that uses six distinct colors. For example, the colors may be white, pink, lavender, pale yellow, mint green, and turquoise. The term color in this disclosure includes black and white as possible color choices.

Alternatively, the color selection of the blocks 100, 175, 185 may be selected to avoid certain colors such as red and green to assist a person with red green color blindness.

Figure 2:
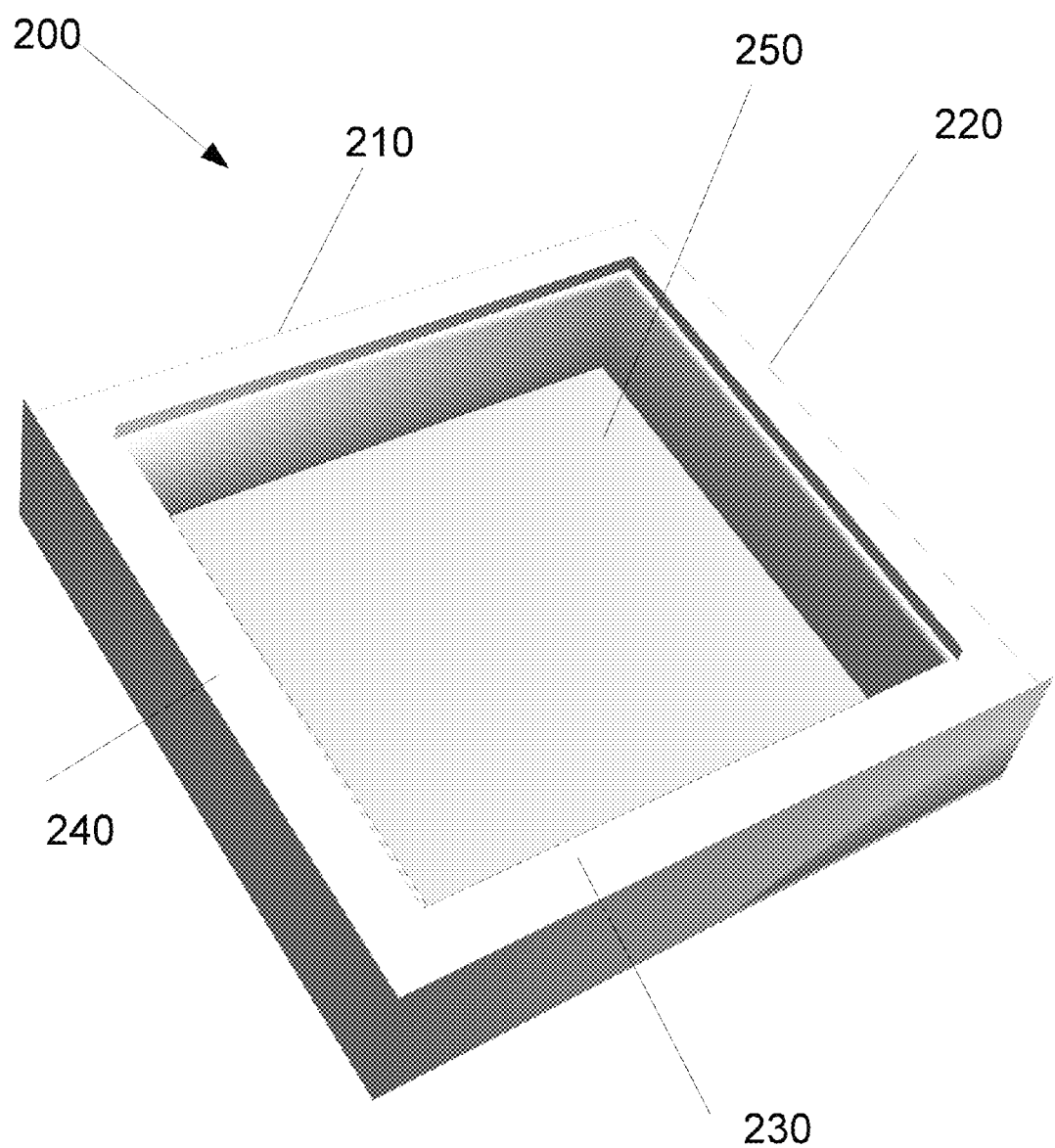
FIG. 2 is a perspective view of a frame.

FIG. 2 is a perspective view of a frame 200. The frame 200 includes a base 250, and four sides 210, 220, 230, and 240. The four sides are sized in such a manner as to hold the blocks 100, 175, 180 within the frame, and to allow a user to easily pull a block 100, 175, or 180 out of frame 200.

Figure 3A:
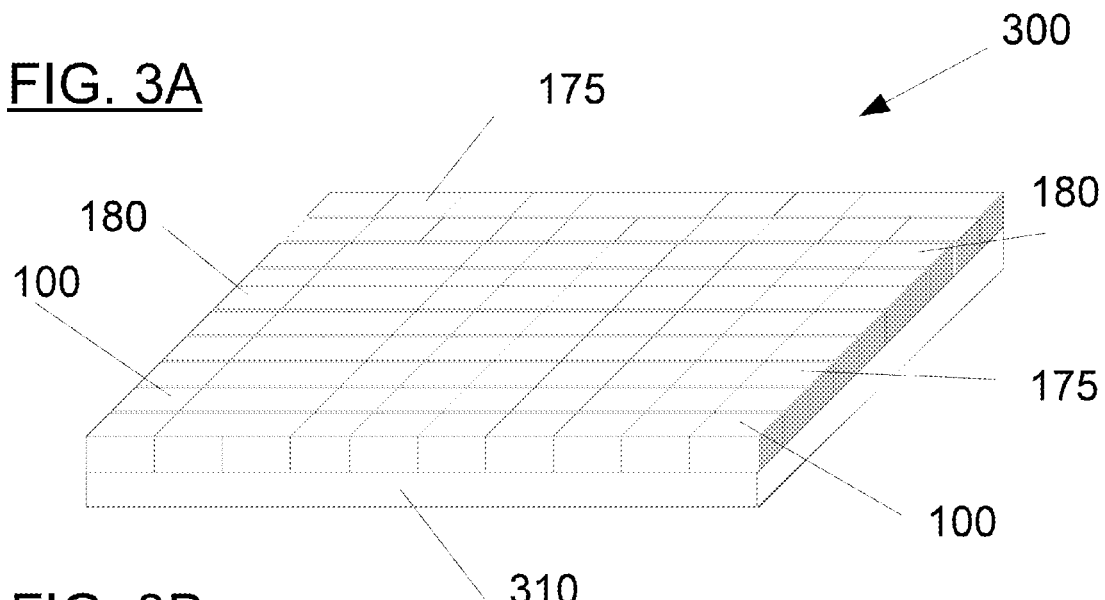
FIGS. 3A-3F are perspective views of different frame and block options.

Frame 200 may come in varying sizes as shown in FIGS. 3A-3F. FIG. 3A is a perspective view of a first frame arrangement 300 that includes one hundred blocks 100, 175, and/or 180. The first frame arrangement 300 includes a frame 310 of sufficient size to hold one hundred blocks. Frame 310 is shown to hold ten rows of ten blocks; however other possible arrangements are also possible. The number of each of first block 100, second block 175, and third block 180 may vary. However, there is at least one first block 100, one second block 175, and one third block 180 in the first frame arrangement 300. This frame 310 allows for six hundred possible color choices to be used in the frame.

Figure 3B:
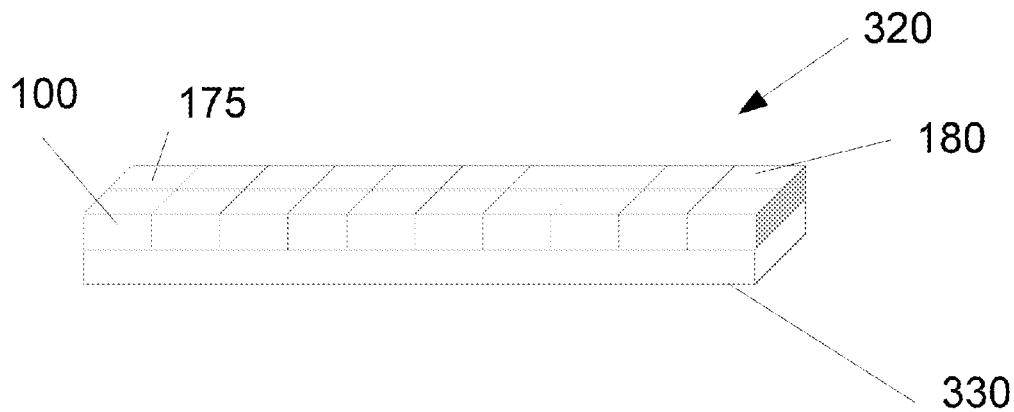

FIG. 3B is a perspective view of a second frame arrangement 320 with twenty blocks 100, 175, and/or 100. The second frame arrangement 320 includes a frame 330, and the frame includes two rows of ten blocks; however other possibilities may be formed for example four rows of five blocks. The number of each of first block 100, second block 175, and third block 180 may vary. However, there is at least one first block 100, one second block 175, and one third block 180 in the second frame arrangement 320. This frame 330 allows for one hundred twenty color choices to be used in the frame.

Figure 3C:
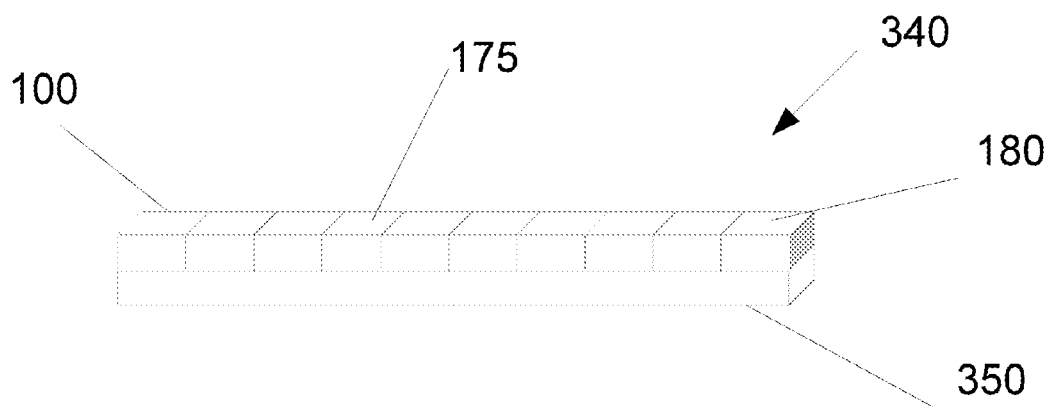
Figure 3D:
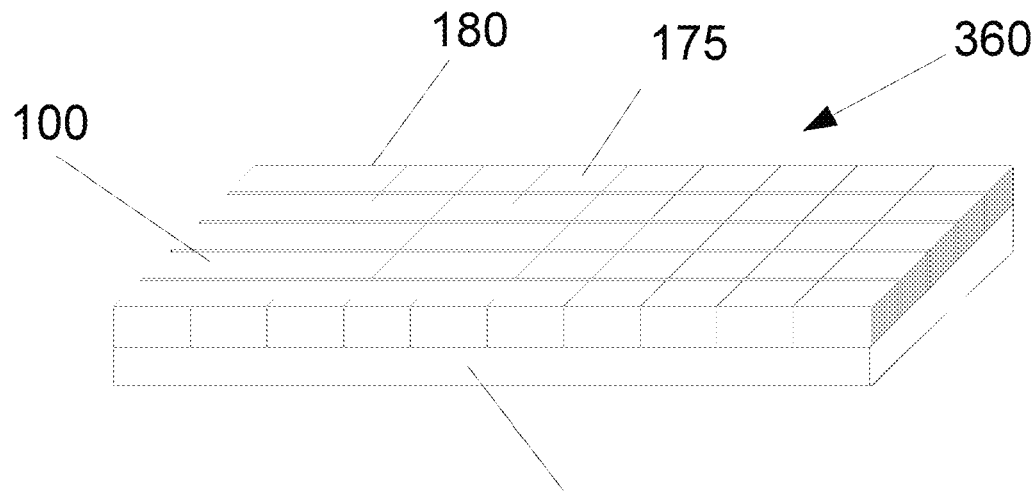
Figure 3E:
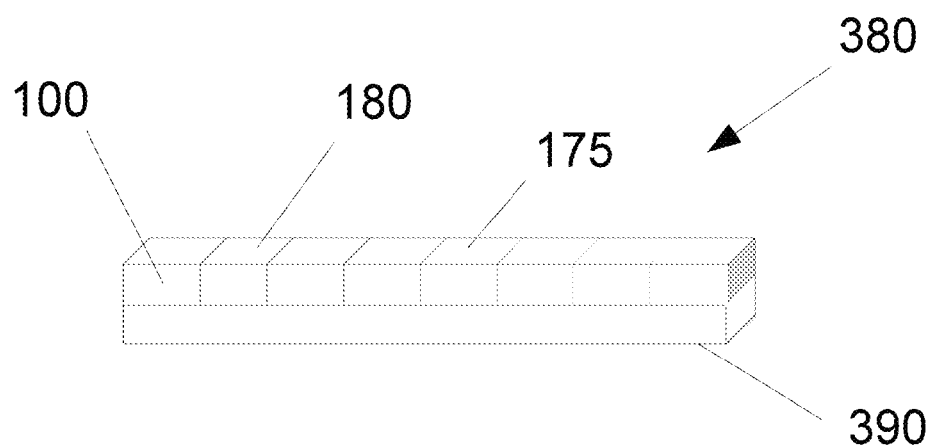
Figure 3F:
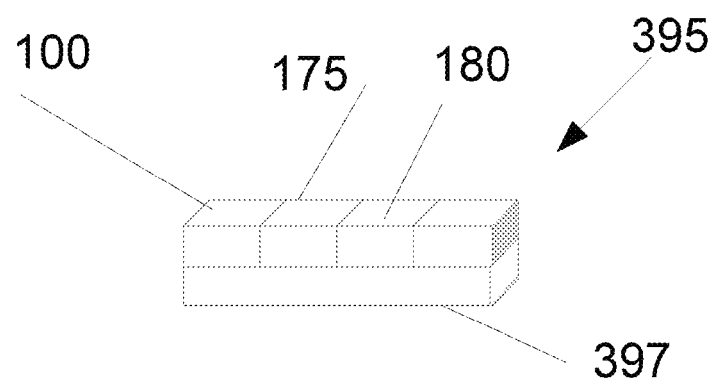

FIG. 3C is a perspective view of a third frame arrangement 340 within frame 350. FIG. 3D is a perspective view of a fourth frame arrangement 360 within frame 370. FIG. 3E is a perspective view of a fifth frame arrangement 380 within frame 390. FIG. 3F is a perspective view of a sixth frame arrangement 390 within frame 395. Each frame arrangement 340, 360, 380, and 390 includes at least one first block 100, one second block 175, and one third block 180. The number of each first block 100, second block 175, and third block 180 may vary.

The different size frames allow for controlling the number of blocks given to child or special needs adult. Smaller frames are generally meant for younger children and larger frames are generally meant for older children. For example, frame arrangement 395 that includes only four blocks may be used for a toddler, a preschooler, or developmentally delayed child. Frame arrangement 340 with ten blocks may be used for a kindergartener or first grader. Frame arrangement 300 with one hundred blocks may be used for a fourth or fifth grader. However, depending on the lesson used any frame arrangement may be used with any age. For example, a simple stacking game may use frame arrangement 300 with one hundred blocks for a preschooler. The blocks 100, 175, and 180 may be used in a sorting game, however the one hundred blocks may be overwhelming for a preschooler and work better with a smaller frame arrangement.

Additionally, more than one frame may be used in combination. For example, a teacher may use frame arrangement 300 with one hundred blocks and each child or team may have frame arrangement 340 with ten blocks. The teacher may show math skills based on one hundred and ten and the children can replicate that on their frames based on ten.

Alternatively, frame arrangement 300 may include a clamping mechanism to hold ten of frame arrangement 340 together. This would allow ten separate frames of ten to be used in a lesson, but also allow a single child or team to work on skills of one hundred. Alternatively, a combo package may include different size frames that may be used together or alone.

The various frame sizes and blocks can be used to teach and explore fractions, counting, patterns, probability, decimals, percents, place value, number sense, and more. For example, when a toddler stacks four blocks outside of the frame, the toddler will see varying colors if they try to stack with the blacks on top. Also, if a preschooler creates a pattern with one side of the faces, such as red green red green, the preschooler will see the variation in location of the other colors along another side of the pattern. This allows a teacher or a parent to ask questions how about how many blacks or yellows the child sees when the pattern is made. Then what happens if your make the pattern again are the number of blacks the same and is the number of yellows the same or different.

There are endless lessons that can be used in a classroom or preschool. Also the lessons may vary when used to teach one child, a small group of children, or a whole classroom of children. Also the lessons may vary for special needs children and special needs adults.

Figure 4:
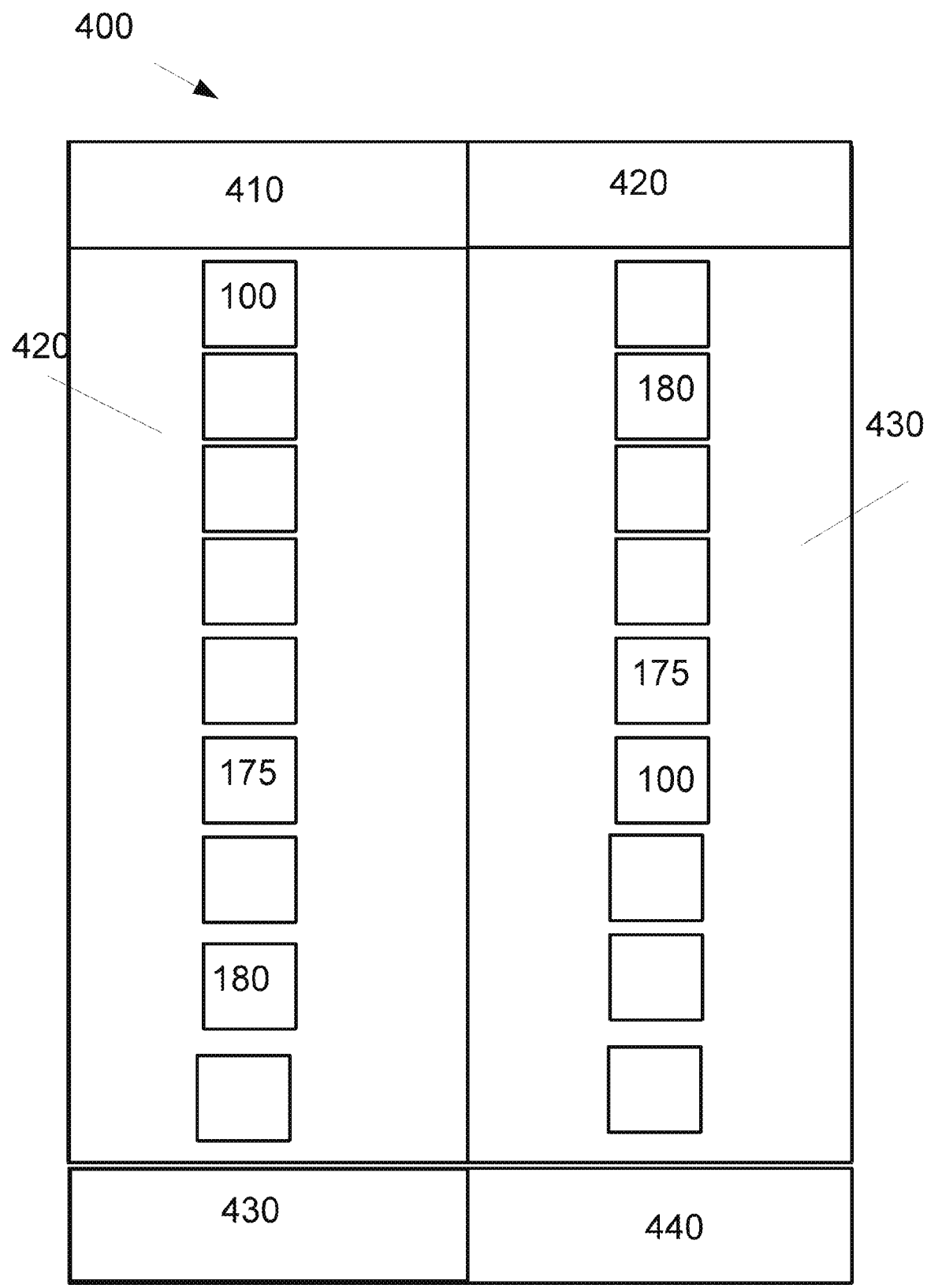
FIG. 4 is a top view of another frame option.

FIG. 4 is a top view of frame 400 to assist a child in learning place value. Frame 400 includes two vertical sections 420, 430 for placing blocks. For learning tens, and ones, both sections 420, and 430 could hold up to nine blocks each. The frame 400 may also be used for tens, and hundreds; however the hundreds section may use nine blocks just for examples but nine blocks is not sufficient to go to thousands. So a frame for tens and hundreds may have different sized sections 420, 430.

Frame 400 may also include title sections 410 and 420. Title sections 410, 420 may include the word "TENS" and "ONES" respectively. Alternatively, sections 410, 420 may be "HUNDREDS" and "TENS" respectively. In another alternative, sections 410 and 420 may be formed from chalkboard type material, dry erase type material, or other erasable material, to allow the user or teacher to write the titles.

Further, frame 400 may include writing sections 430 and 440. Writing sections 430 and 440 may be formed from chalkboard type material, dry erase type material, or other erasable material where a user can write the numbers with respect to the number of blocks in each section 420 and 430. For example, if vertical section 420 represents tens and vertical section 430 represents ones, and there are 4 blocks in vertical section 420 and 2 blocks in vertical section 430, then the child writes the number "4" in writing section 430 and "2" in writing section 440. The child then reads that they have "42".

Figure 5:
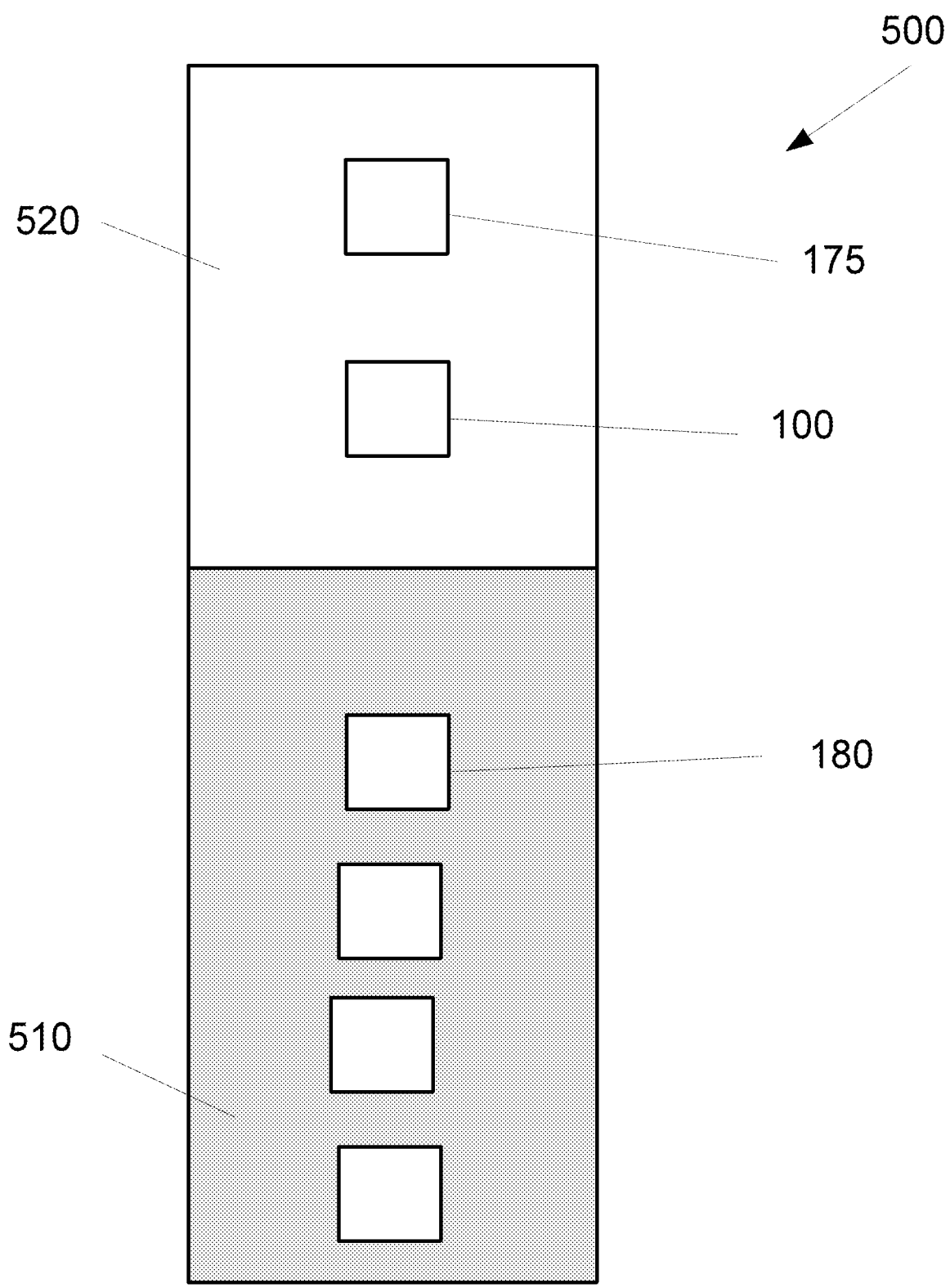
FIG. 5 is a top view of an insert that may be used with a frame.

FIG. 5 is a top view of an insert that may be used alone or placed within any frame for assisting a child with a concept. For example, insert 500 may be used within vertical section 430 to assist a child in rounding. Section 510 is large enough to hold only up to four blocks. If there are only blocks in section 510, then the child is taught to round down. If there are five or more blocks on top of insert 500, then some of the blocks fall within section 520. Section 520 is shown as the shaded area and can hold up to five blocks. If there are five or more blocks within both sections 510 and 520, then the child is taught to round up.

The foregoing description has been directed to specific embodiments. It will be apparent, however, that other variations and modifications may be made to the described embodiments, with the attainment of some or all of their advantages. For instance, it is expressly contemplated that the blocks may include different colors than shown and the frame sizes may vary. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A toy, comprising:
a frame; and
a plurality of blocks, wherein each block includes a different color on each face and each block of the plurality of blocks includes the same colors, with a first face having a first color and a second face having a second color, and the color assigned to each of the remaining faces varies between at least two blocks of the plurality of blocks.

2. The toy as in claim 1, wherein the first face is opposite the second face.

3. The toy as in claim 1, wherein the first face is white and the second face is black, and the colors assigned to the remaining faces are blue, red, yellow, and green.

4. The toy as in claim 1, wherein the color of each face extends to the edge of each face.

5. The toy as in claim 1, wherein each block includes six faces and six different colors.

6. The toy as in claim 1, wherein the frame is sized to hold 100 blocks, 50blocks, 25 blocks, 20 blocks, 16 blocks, 10 blocks, 5 blocks, 18blocks or 4 blocks.

7. The toy as in claim 1, wherein the colors include black, white, red, yellow, blue, orange, green, or purple.

8. A toy, comprising:
a frame, wherein the frame is configured with two vertical sections for holding blocks, and each section is configured to hold nine blocks; and
a plurality of blocks, wherein each block includes a different color on each face with a first face having a first color and a second face having a second color, and the color assigned to each of the remaining faces varies between at least two blocks of the plurality of block.

9. The toy as in claim 8, wherein the frame further includes an erasable base section where a user can write the number of blocks placed in each section.

10. The toy as in claim 8, further comprising an insert that is placed within one vertical section, wherein the insert includes a first section for holding up to four blocks and a second section for holding up to five blocks to assist in teaching rounding concept.

11. A toy, comprising:
a plurality of blocks, wherein each block includes six separate faces and each face is assigned one of six colors, with a first face assigned white and a second face assigned black and the remaining colors are each assigned to each of the remaining faces and the locations of remaining colors vary in location between at least two blocks of the plurality of blocks.

12. The toy as in claim 11, wherein the first and second faces are on opposing sides of each block.

13. The toy as in claim 11, wherein the blocks are cubed shape and each color extends to face edge.

14. The toy as in claim 11, further comprising a frame and is sized to hold any positive integer of blocks less than or equal to 100.

15. The toy as in claim 11, further comprising at least two frames, wherein a first frame is a demonstration frame and a second frame is for a user frame.

16. The toy as in claim 15, wherein the two frames are the same size.

17. The toy as in claim 15, wherein the first frame is larger than the second frame.

18. The toy as in claim 15, wherein the second frame is sized to fit within the first frame.

\* \* \* \* \*